United States Patent [19]
Mason

[11] 3,782,773
[45] Jan. 1, 1974

[54] REUSABLE TREE CARRIER
[76] Inventor: Jack D. Mason, 2170 Rosier Rd., Augusta, Ga. 30906
[22] Filed: Apr. 21, 1972
[21] Appl. No.: 246,249

[52] U.S. Cl. .................................. 296/3, 220/4 F
[51] Int. Cl. ............................................ B60p 3/00
[58] Field of Search ................ 296/3; 220/4 R, 4 F, 220/DIG. 13; 229/41 C, 41 D, 22, 13; 214/3

[56] References Cited
UNITED STATES PATENTS
3,032,368   5/1962   Sigler ..................................... 296/3
3,161,989   12/1964  Sigler ................................. 214/3 X
2,919,045   12/1959  Waugh ............................... 220/4 F FOREIGN PATENTS OR APPLICATIONS
178,837    4/1962   Sweden ............................. 220/4 F Primary Examiner—Philip Goodman
Attorney—Harvey B. Jacobson et al.

[57] ABSTRACT

An apparatus for moving trees and the like has a frame provided with wheels and a plurality of annular members of collars pivotally mounted thereon. The collars are mounted on the frame in adjacent parallel rows, the members of one row alternatingly spaced with the members of the other row. A carrier device in the form of a right octagonal cone holds the root-ball of a tree and the like, and is selectively arrangeable in a collar. The carrier device is formed from a plurality of sections selectively connected together as by pins received in holes provided on the sections. Each section has a surface in the shape of an isosceles triangle, with each equal leg thereof having a portion extending therefrom at an acute angle to the plane of the isosceles triangle and shaped as a right triangle.

17 Claims, 6 Drawing Figures

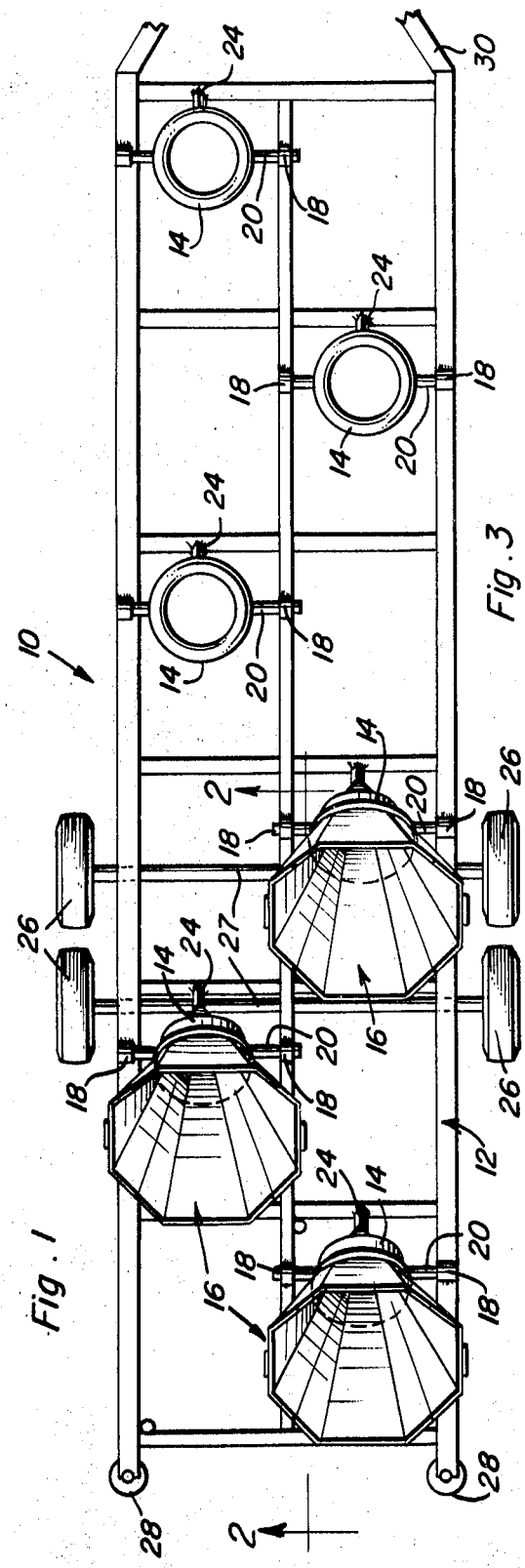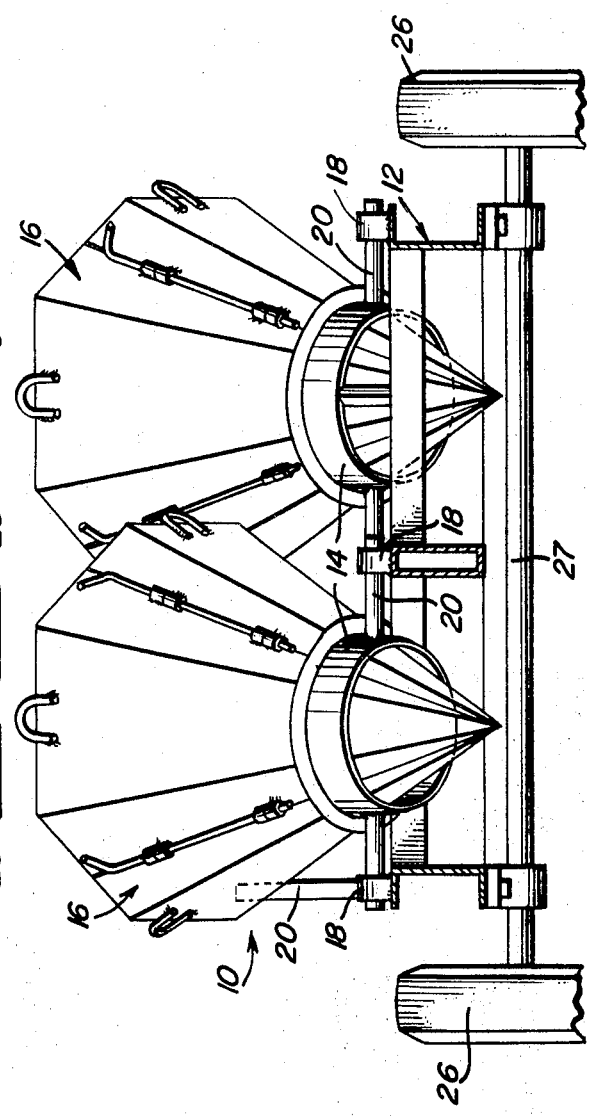

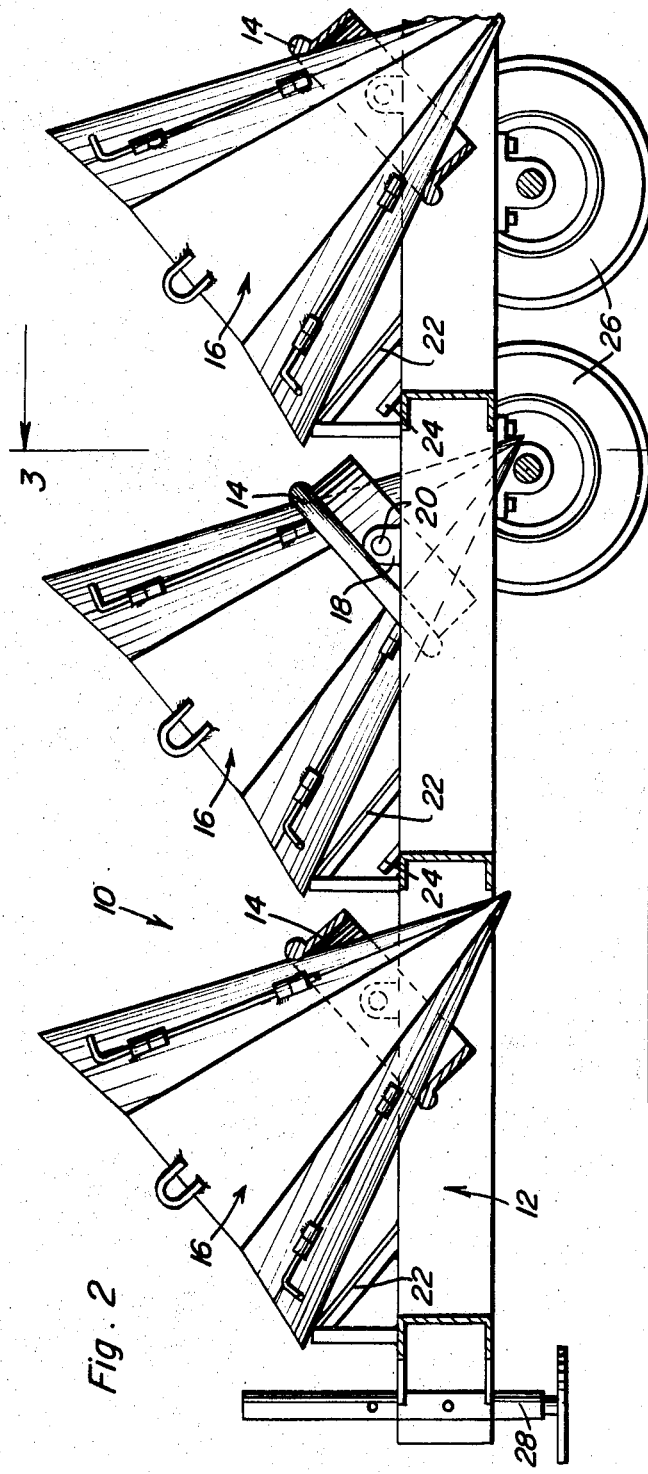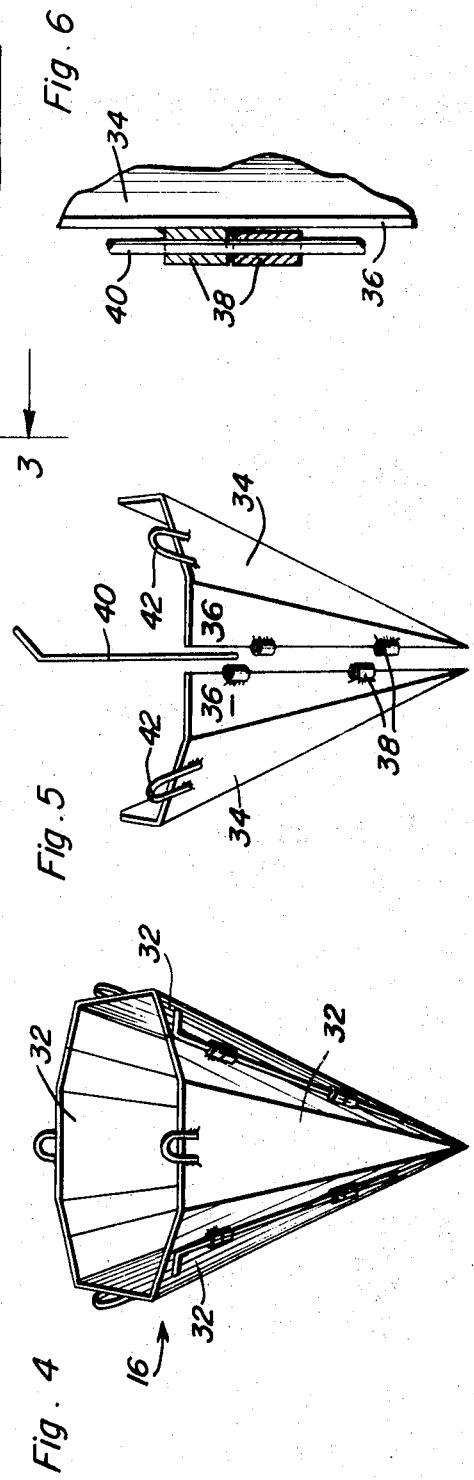

REUSABLE TREE CARRIER

BACKGROUND OF THE INVENTION

1. Field of the Invention

This invention relates in general to apparatus for moving trees and the like, and in particular to such an apparatus for moving relatively large trees.

2. Description of the Prior Art

Devices are known for quickly moving and transplanting small trees, shrubs and bushes. These known tree spades, such as those manufactured by the Vermeer Manufacturing Company under the trade name "Pow-R-Line," form a tree-ball of the roots of the tree in the process of digging the tree out of the ground. When it is desired to move this balled tree a long distance, and even more importantly when the tree is a large tree, the problem arises as to just how to carry the tree or the like on a truck and the like.

U. S. Pat. No. 3,032,368, discloses a tree float or trailer in which a balled tree is placed in a container, which is in turn placed in a receptacle pivotally mounted to a frame. This frame may be provided with wheels, or may be loaded onto a truck bed, railroad car, and the like. The particular construction and arrangement of the container and receptacles of this known tree moving apparatus, however, is of a rather complex nature with resulting high fabrication and maintenance costs.

SUMMARY OF THE INVENTION

It is an object of the present invention to provide apparatus for moving trees and the like from one location to another that is simpler in construction and more efficient in operation than known apparatus of this type.

It is another object of the present invention to provide an improved reusable tree carrier of particularly advantageous design and construction.

These and other objects are achieved according to the present invention by providing an apparatus for moving trees and the like which has a frame and a plurality of annular members or collars mounted on the frame in adjacent parallel rows, the members of one row being alternatingly spaced with the members of the other row. A reusable tree carrier is provided for holding the root-ball of a tree and the like, and is arrangeable in a collar.

According to a preferred embodiment of the present invention, this tree carrier has a plurality of sections, and means are provided for selectively connecting the sections to adjacent sections. This connecting means may be pins which are received in holes provided in the sections.

Advantageously, the sections may form a continuous surface in the shape of a right cone, and each section has a surface in the shape of an isosceles triangle with each equal leg thereof having a portion extending therefrom at an acute angle to the plane of the isosceles triangle and shaped as a right triangle to form a right octagonal cone.

The frame of the apparatus according to the present invention may be provided with support surface engaging wheels mounted thereon, or may be arranged to be placed on the bed of a truck, in a railroad car, or in or on any other suitable, known conveyance.

These together with other objects and advantages which will become subsequently apparent reside ithe details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, top plan view showing an apparatus according to the present invention for moving trees and the like.

FIG. 2 is a fragmentary, sectional view taken generally along the line 2—2 of FIG. 1.

FIG. 3 is a fragmentary, end elevational view showing the apparatus of FIGS. 1 and 2.

FIG. 4 is a perspective view showing a reusable tree carrier according to the present invention.

FIG. 5 is an exploded perspective view showing a portion of the reusable tree carrier of FIG. 4.

FIG. 6 is a fragmentary, detail view, partly in section, showing a preferred manner of selectively connecting together sections forming a reusable tree carrier according to the present invention.

DESCRIPTION OF THE PREFERRED EMBODIMENTS

FIGS. 1 to 3 of the drawings show an apparatus 10 according to the present invention for moving trees and the like (not shown). This apparatus 10 has a frame 12 and a plurality of annular members or collars 14 pivotally mounted on frame 12 in adjacent parallel rows. The members or collars 14 of one row are alternatingly spaced with the members or collars 14 of the other row. Reusable carrier devices 16 are provided for carrying the root-ball (not shown) of a tree and the like, and are selectively arrangeable in collars 14. Carrier devices 16 may be in the form of a right cone, as shown in the drawings.

Collars 14 are pivotally mounted to frame 12 as by a pair of bearings 18 and a shaft 20 journalled therein. Collars 14 are mounted to shaft 20 in a known manner for rotation therewith. An abutment 22 is associated with each collar 14, and is arranged for contacting the base of carrier device 16 in one position of collar 14 for limiting movement thereof. A stop 24 is also associated with each collar 14, and is arranged for contacting the member or collar 14 in a position opposed to the position for abutment 22 for limiting the movement thereof in that direction. Support surface engaging wheels 26 are shown mounted on frame 12, but alternatively frame 12 could be arranged directly on a supporting surface of a suitable, known conveyance (not shown). When wheels 26 are provided, supports 28, which may be of a suitable, known type, may be provided at one end of frame 12 for supporting same when not connected to a tractor and the like (not shown) as by suitable known connecting structure 30.

As can best be seen from FIGS. 4 to 6 of the drawings, each carrier device 16 has a plurality of sections 32, four being shown in the drawings. These sections 32 mate to form a continuous surface in the shape of a right cone. Each section 32 has a portion in the shape of an isosceles triangle with each equal leg thereof having a portion 36 extending therefrom at an acute angle to the plane of portion 34 and shaped as a right triangle to form a right octagonal cone when mated with other sections 32. Each portion 36 has one or more tubes 38 mounted thereon and provided with a hole for receiving a pin 40 for selectively connecting adjacent sections 32 to one another. Loops 32 may be further provided with a loop 42 forming an eye to receive the hook of a conventional crane and the like.

Sections 32 may be fabricated in a conventional manner from, for example, sheet steel having a thickness depending upon the size of the carrier device 16.

The use of apparatus 10 can be readily understood from the above description. After a tree, shrubbery, and the like have been mechanically dug with a conventional tree spade, it may be placed into a carrier device 16 in a known manner. Device 16 may then be lifted, as by the hook (not shown) of a conventional crane and the like (not shown) engaging a loop 42, into a member or collar 14. Members or collars 14 are preferably weighted so as to pivot against their associated stops 24 when a device 16 is not in position therein. Once a device 16 has been placed into a collar 14, that collar will pivot against abutment 22. This will place the upper portion of the tree and the like (not shown) in a tilted position, permitting it to pass under utility lines and the like. When the tree and the like has been transported to the location at which it is to be transplanted, a hole is first dug as by a tree spade. Carrier device 16 is then lifted from collar 14 as by a crane and the like and is placed into the hole. Pins 40 may now be removed, and two opposed sections 32 removed from the hole. Then the other two opposed sections 32 may be removed in a like manner. The carrier device 16 may then be reassembled by replacing pins 40, and be reused again and again. Thus, reusable apparatus for moving trees and the like is achieved in a simple and inexpensive manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for moving trees and the like, comprising, in combination:
   a. a frame;
   b. at least one means mounted on said frame for receiving a root-ball of a tree and the like; and
   means arrangeable in the receiving means for carrying the root-ball of a tree and the like, the carrying means including a plurality of sections, and means for selectively connecting said sections to an adjacent section, the sections mating to form a continuous conic surface.

2. A structure as defined in claim 1, wherein the connecting means includes pins, and the sections are provided with means arranged parallel to an edge thereof for receiving the pins.

3. A structure as defined in claim 1, whereithe receiving means includes an annular member pivotally mounted on wherein the frame, abutment means arranged for contacting the base of the conic surface of the carrying means in one position of said annular member and limiting the movement thereof, and stop means arranged for contacting said annular member in a position opposed to said one position and limiting the movement thereof.

4. An apparatus for moving trees and the like, comprising, in combination:
   a. a frame;
   b. at least one means mounted on said frame for receiving a root-ball of a tree and the like; and
   c. means arrangeable in the receiving means for carrying the root-ball of a tree and the like, the carrying means including a plurality of sections and means for selectively connecting said sections to an adjacent section, the sections mating to form a continuous surface in the shape of a right cone, and each section having a portion in the shape of an isosceles triangle with each equal leg thereof having a portion extending therefrom at an acute angle to the plane of said isosceles triangle and shaped as a right triangle for forming a right octagonal cone when mated with other said sections.

5. A structure as defined in claim 4, wherein the connecting means includes pins, and the sections are provided with means fo receiving the for 6. A structure as defined in claim 5, wherein the receiving means includes an annular member pivotally mounted on said frame.

7. A structure as defined in claim 4, wherein the receiving means includes an annular member pivotally mounted on said frame.

8. A structure as defined in claim 7, wherein the receiving means further includes means for limiting pivoting movement of the receiving means.

9. A structure as defined in claim 7, wherein a plurality of annular members are mounted on said frame in adjacent parallel rows, the members of one row alternatingly spaced with the members of the other row.

10. A structure as defined in claim 4, further including support surface-engaging wheels mounted on said frame.

11. A structure as defined in claim 7, wherein the receiving means further includes abutment means arranged for contacting the base of said right cone in one position of said annular member and limiting the movement thereof, and stop means arranged for contacting said annular member in a position opposed to said one position and limiting the movement thereof.

12. A structure as defined in claim 11, wherein a plurality of annular members are mounted on said frame in adjacent parallel rows, the members of one row alternatingly spaced with the members of the other row.

13. A structure as defined in claim 12, further including support surface-engaging wheels mounted on said frame.

14. A reusable carrier device for holding trees and the like, comprising, in combination:
   a. a plurality of sections matable to form a holding surface, the surface formed by the mating sections being a continuous conic surface; and
   b. means for selectively connecting said sections to an adjacent section.

15. A reusable carrier device for holding trees and the like, comprising, in combination, the surface formed by the mating sections being a continuous surface in the shape of a right cone, and each section having a portion in the shape of an isosceles triangle with each equal leg thereof having a portion extending therefrom at an actute angle to the plane of said isosceles triangle and shaped as a right triangle for forming a right octagonal cone when mated with other said sections:
   a. a plurality of sections matable to form a holding surface; and b. means for selectively connecting said sections to an adjacent section.

16. A structure as defined in claim 15, wherein the connecting means includes pins, and the sections are provided with means for receiving the pins.

17. A structure as defined in claim 14, wherein the connecting means includes pins, and means provided on the sections and arranged parallel to an edge thereof for receiving the pins.

* * * * *